(12) United States Patent
Boyd et al.

(10) Patent No.: US 10,331,744 B2
(45) Date of Patent: Jun. 25, 2019

(54) PRESENTING SUPPLEMENTAL CONTENT IN CONTEXT

(75) Inventors: Danah Boyd, Boston, MA (US); Gilad Lotan, Boston, MA (US); Paul Oka, Boxborough, MA (US); Emre Mehmet Kiciman, Seattle, WA (US); Chun-Kai Wang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/602,015

(22) Filed: Aug. 31, 2012

(65) Prior Publication Data

US 2012/0330932 A1   Dec. 27, 2012

Related U.S. Application Data

(63) Continuation-in-part of application No. 12/795,392, filed on Jun. 7, 2010, now abandoned.

(51) Int. Cl.
*G06F 17/30* (2006.01)
*G06F 16/9535* (2019.01)

(52) U.S. Cl.
CPC .............................. *G06F 16/9535* (2019.01)

(58) Field of Classification Search
None
See application file for complete search history.

(56) References Cited

U.S. PATENT DOCUMENTS

| 7,185,065 | B1 * | 2/2007 | Holtzman et al. | 709/217 |
| 7,788,260 | B2 * | 8/2010 | Lunt et al. | 707/727 |
| 7,853,881 | B1 * | 12/2010 | Aly Assal | G06Q 30/02 715/734 |

(Continued)

FOREIGN PATENT DOCUMENTS

WO   WO 2010048172 A1 *  4/2010  ....... G06F 17/30705

OTHER PUBLICATIONS

Golbeck et al., "SocialBrowsing: Integrated Social Networks and Web Browsing", CHI 2007, pp. 2381-2386, 2007 ACM.*

(Continued)

*Primary Examiner* — Aleksandr Kerzhner
*Assistant Examiner* — Eddy Cheung
(74) *Attorney, Agent, or Firm* — Medley, Behrens & Lewis, LLC

(57) ABSTRACT

Techniques that may be used for detecting a primary content (e.g., a web page) that the user is viewing and presenting one or more pieces of supplemental content (e.g., social media data) together with the primary content. The supplemental content presented to the user together with the primary content may be content that is matched to the primary content and therefore detected to be relevant to the user. Detection of primary content and matching to supplemental content may be carried out based on a comparison of entities related to the primary and supplemental content. In some embodiments, an analysis of the primary content for entities may include ordering entities according to significance in the primary content and selecting top entities for comparison. Also, in some embodiments, multiple pieces of supplemental content may be displayed to a user categorized based on entity.

21 Claims, 11 Drawing Sheets

(56) References Cited

U.S. PATENT DOCUMENTS

| | | | |
|---|---|---|---|
| 2004/0205651 A1* | 10/2004 | Dutta | G06F 17/30882 715/255 |
| 2006/0259473 A1* | 11/2006 | Li | G06Q 30/02 |
| 2007/0124432 A1* | 5/2007 | Holtzman | G06F 17/2745 709/219 |
| 2008/0077574 A1* | 3/2008 | Gross | G06F 17/30699 |
| 2008/0134040 A1* | 6/2008 | Pennington | G06F 17/3089 715/733 |
| 2009/0048928 A1* | 2/2009 | Gross | G06F 17/30867 705/14.42 |
| 2009/0249244 A1* | 10/2009 | Robinson | G06F 3/0481 715/781 |
| 2009/0282002 A1* | 11/2009 | Reeder | G06Q 30/02 |
| 2009/0292526 A1* | 11/2009 | Harari | G06F 17/2765 704/9 |
| 2010/0030715 A1* | 2/2010 | Eustice | G06Q 10/10 706/12 |
| 2011/0289088 A1* | 11/2011 | Yarin | G06F 17/30781 707/738 |
| 2012/0001919 A1* | 1/2012 | Lumer | G06F 17/30705 345/440 |
| 2013/0097522 A1* | 4/2013 | Devries | 715/745 |

OTHER PUBLICATIONS

Yoshida et al., "WeBrowSearch: Toward Web Browser with Autonomous Search", WISE 2007, LNCS 4831, pp. 135-146, 2007, Springer-Verlag Berlin Heidelberg.*

Qiang et al., "WebTelop: Dynamic TV-Content Augmentation by Using Web Pages", ICME 2003, pp. 173-176, 2003, IEEE.*

Kraft et al., "Y!Q: Contextual Search at the Point of Inspiration", CIKM '05, pp. 816-823, 2005, ACM.*

Li et al., "User Comments for news recommendation in forum-based social media", Information Sciences 180, pp. 4929-4939, 2010, Elsevier Inc.*

Huynh et al., "Enableing Web Browsers to Augment Web Sites' Filtering and Sorting Functionalities", UIST '06, pp. 125-134, 2006, ACM.*

Kayaalp et al., "A Collaborative and Content Based Event Recommendation System With Data Collection Scrapers and Services at a Social Networking Site", 2009 Advances in Social Network Analysis and Mining, pp. 113-118, Jul. 2009, IEEE.*

* cited by examiner

PRESENTING SUPPLEMENTAL CONTENT IN CONTEXT

RELATED APPLICATIONS

This application is a Continuation-in-Part of U.S. patent application Ser. No. 12/795,392, filed on Jun. 7, 2010, and entitled "PRESENTING SUPPLEMENTAL CONTENT IN CONTEXT", the entirety of which is incorporated herein by reference.

This application is related to U.S. application Ser. No. 12/270,974, entitled "Social network referral coupons," filed on Nov. 14, 2008, which is herein incorporated by reference in its entirety.

This application is related to U.S. application Ser. No. 12/614,457, entitled "Social browsing," filed on Nov. 9, 2009, which is herein incorporated by reference in its entirety.

This application is related to U.S. application Ser. No. 12/633,798, entitled "Generating activities based upon social data," filed on Dec. 9, 2009, which is herein incorporated by reference in its entirety.

This application is related to U.S. application Ser. No. 12/761,666, entitled "Social home page," filed on Apr. 16, 2010, which is herein incorporated by reference in its entirety.

BACKGROUND

Network services—including messaging systems, blogging services, discussion boards, and social network services—permit users to identify one another and share multiple types of information with one another. Users of these services may establish profiles that include information about the users' identity and interests, and other users may view this information or receive notifications when the information changes. Users may also send messages to one another, such as by sending private messages, sending multicast messages, and sending broadcast messages. Some network services enable users to share information about their past, present, or future interests and activities, and allow other users to receive notifications about these interests and activities. Further, pictures, audio, videos, web content, and other types of information may be shared between users. Sending such messages and sharing such information between users is done actively, by a user designating other users to receive some information, or passively, such as by posting messages and information in a publicly-accessible location or in a location accessible to other users with which the user has a connection.

To receive such information, users of network services establish links or connections to one another that indicate an offline relationship between the users. For example, a connection may be created between family members, friends, or co-workers. Additionally, a connection may be created between people without an existing offline relationship, such as between a user and another that the user has identified in the network service. When users are connected in this way, the network service may make available to the users information that has been actively or passively shared between users (e.g., explicitly broadcast or posted in an accessible location).

Network services such as these include services like Facebook®, Twitter®, Microsoft® Mingle, and Google® Reader, which permit users to share information with "friends" (in) Facebook® and "followers" (in Twitter® and Google® Reader).

Other ways exist in which people may share information and exchange content. For example, people may publish information they release online (e.g., blog entries, photos, etc.) or distribute notifications regarding the information via a feed protocol like the Really Simple Syndication (RSS) protocol or the Atom Publishing Protocol (Atom). Other people may then download and view entries in the feed using a feed reader.

Some services exist that manipulate information available via network services, feed readers, and other web distribution tools. These tools operate to filter or reorganize the available information based on explicit user input. For example, the TwitterTim.es service allows a user to establish particular "channels" from his or her Twitter feed that each filter the Twitter content that fits the parameters of those channels.

SUMMARY

Individual users can become overwhelmed with the amount of content that is available for consumption via network services, feeds, and other sources. Users often find that viewing all of the content is unachievable. When this happens, users may then avoid viewing any content at all or may view some content without being sure that they are viewing the most relevant content.

Described herein are techniques that may be used for detecting a primary content (e.g., a web page) that the user is viewing and presenting one or more pieces of supplemental content (e.g., social media data) together with the primary content. The primary content may be any content that the user is experiencing, and the supplemental content may be any distributed information to which the user has subscribed and/or in which the user has previously showed interest. The supplemental content presented to the user together with the primary content may be content that is matched and related to the primary content and therefore detected to be relevant to the user. Detection of primary content and matching to supplemental content may be carried out based on a comparison of entities related to (e.g., mentioned in) the primary and supplemental content. In some embodiments, an analysis of the primary content for entities may include ordering entities according to significance in the primary content and selecting top entities for comparison. Also, in some embodiments, multiple pieces of supplemental content may be displayed to a user categorized based on entity.

In one illustrative embodiment, a user may be viewing a web page as primary content. Various entities referenced in the web page (e.g., words used in the web page) may be detected from an analysis of the web page. The entities may then be ordered according to their significance in the web page. Entities may also be extracted from social media data, and a comparison of entities for the web page and entities for the social media data carried out. A set of matched entities, and social media related to those entities, may then be presented to the user as a set of social media data that is relevant to the user at that time (i.e., related to the primary content the user is viewing). In this way, a user may be aided in locating and viewing social media data that is relevant to the user.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
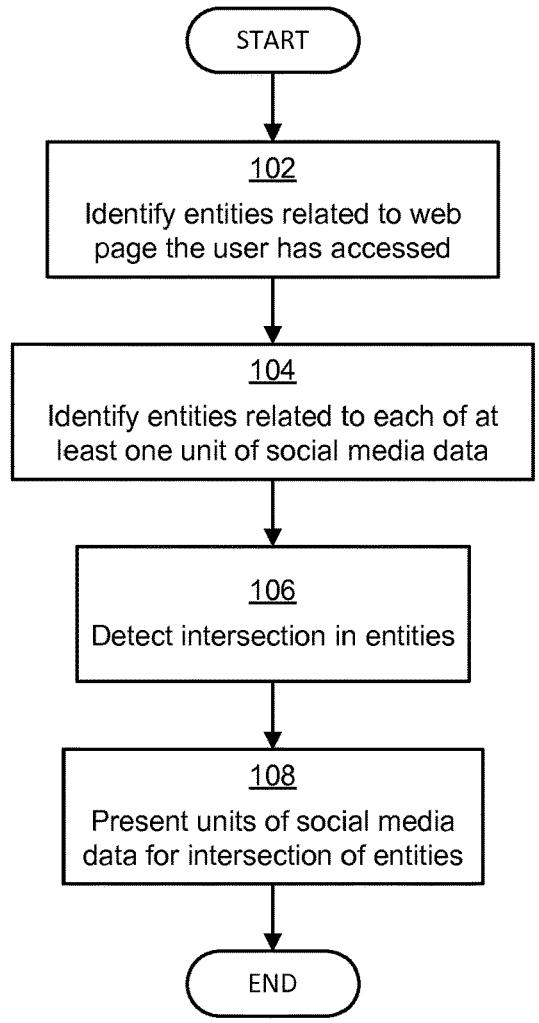
FIG. 1 is a flowchart of one exemplary overall process for presenting supplemental content to a user.

As the number and type of ways to distribute information grows, and as the number of people distributing information grows, individual users may become overwhelmed with the amount of content that is directed to them. A user, for example, may become overwhelmed by the amount of information available via network services and other sources (e.g., feeds, email accounts, instant messaging, etc.) and thus may not read all or even any of the information.

Users, however, initially become affiliated with and use these services so that the users could receive and view the content distributed via these services. Users may therefore attempt to view the most recent or most "important" information, but may still overlook some content. Some may sort or filter the content, but sorting or filtering the content based on explicit input from the user (e.g., a keyword search) still leaves open the possibility that the user's input is not comprehensive and some important content will be missed by the user. The risk of missing important content may make some users feel anxious.

Users want to receive and view content distributed via these services because they expect that the content will be meaningful and relevant to them. Users are therefore most likely to be interested in viewing "relevant" content. What content is "relevant," however, may vary based on current interests and activities of a user. Content that may be relevant to a user at one time may not be relevant to the user at another time, based on a change in the user's interests and activities. Detecting a user's current interests, then, may aid the user in identifying and viewing relevant content.

Described herein are various techniques for detecting a user's current interests and activities to determine topics that are relevant to the user. Topics that may be relevant may be used to examine set of available content (e.g., social media data) and "surface" content from the set that is relevant to the user at that time.

In some embodiments, to detect a user's current interests and activities, primary content that the user is experiencing may be analyzed to determine a topic of the primary content, which may be indicative of the user's current interests/ activities. This analysis may be carried out by identifying entities that are related to the primary content, including entities that are referenced in the primary content. In some cases, the entities that are identified may be ordered by significance to determine the most significant entities related to the primary content, which may further identify the topic of the primary content and aid in identifying the user's current interests/activities. Entities related to each of multiple units of supplemental content may also be identified. The entities of the primary content and the entities of the supplement content may then be compared to determine matches in entities and, thereby, identify supplemental content that relates to the same topic as the primary content and may be relevant to the user at that time. Units of supplemental content related to entities in the primary content may then be presented to the user for viewing, such that the user can view supplemental content that may be relevant to the user at that time.

For example, in accordance with some of the techniques described herein, a system may detect a user's interests based on a web page (one example of primary content) that the user is viewing by attempting to identify topics to which the web page relates. To do so, the system may identify entities referenced by the web page. Social media data and/or other distributed information to which the user subscribes (examples of supplemental content) may be similarly analyzed to identify entities to which the social media data relates. Social media data that relates to the same entities as the web page may be inferred to be related to the same topic about which the user is reading and therefore inferred to be relevant to the user at that time. Social media data that relates to those entities may therefore be presented to the user together with the web page, to permit the user to view, reply to, or otherwise interact with relevant social media data while viewing the web page.

Embodiments of the principles described herein are not limited to operating with web pages and social media data. Rather, embodiments may operate in connection with any suitable primary content and supplemental content.

Primary content, as used herein, includes any electronic content that the user is presently or was recently experiencing (e.g., viewing, listening, interacting with, etc.). Primary content may include web pages, word processing documents, text documents, presentation slides, photographs, email messages, audio/visual content (e.g., music, movies, television programs, etc.), and/or any other type of electronic content. When a user is experiencing primary content, this primary content may be analyzed to determine the user's current interest(s) and then used to determine supplemental content (e.g., social media data) to be presented to the user as relevant supplemental content.

Supplemental content, as used herein, includes any distributed information to which the user has subscribed. Distributed information includes any information available electronically. A user may subscribe to distributed information when the user has requested that the distributed information be provided to the user. Requesting that the distributed information be provided to the user may be done passively or actively. For example, the user may request that information be provided by transmitting a request to receive the distributed information; retrieving (or configuring a computer program or other agent to retrieve) distributed content from a source; establishing, within a network service, a connection to another user, such that information distributed by the other user (e.g., broadcast, multicast, or unicast) is routed to and received by the user; establishing a location at which to receive distributed information; and/or any other actions to retrieve or receive distributed information.

Distributed information, as used herein, includes content to which a user has subscribed. Examples of distributed information include network data, which includes data distributed by and/or via a network service used by the user. Network data may include social media data (i.e., network data distributed via a social network service), which may include messages shared between users of a social network service (including public social network services and enterprise social network services), media shared between users (including photos, videos, and audio/visual media) and metadata associated with the media (e.g., time, data, place, description, caption, people pictured, etc.), and identifying information regarding users. Distributed information regarding network data may include the network data itself or notifications regarding availability of new or changed network data. Distributed information may additionally or alternatively include web content available via feeds (e.g., RSS or Atom feeds), such as blog entries, news articles, picture galleries, and other web content. Distributed information may additionally or alternatively include instant messaging information (e.g., messages or statuses) and email messages. A unit of distributed information (e.g., a unit of social media data) may be any discrete piece of distributed information, such as a discrete message, blog entry, email message, etc.

In some embodiments, primary content may be any suitable content that a user has chosen to experience, and supplemental content presented to the user may be any other distributed information that is available to the user for viewing and that a content selection system has detected may be relevant to the user at that time and has automatically presented to the user via a sidebar display.

Entities, as used herein, are references to topics concerning primary or supplemental content. When primary or supplemental content is textual, an entity may be a text word or phrase used in the primary or supplemental content. When primary or supplemental content is audio, an entity may be a sound contained in the audio, such as a word or phrase spoken in the audio. When primary or supplemental content is visual, an entity may be a pictured object (e.g., a person, animal, etc.). Entities may also be referenced in metadata of primary or supplemental content, such as a time or place at which primary or supplemental content originated or a source of the primary or secondary content. Entities may be determined using any suitable analysis of any part of primary or supplemental content, examples of which are discussed below.

For ease of description and clarity, in various examples below primary content will be discussed as a web page, supplemental content will be discussed as social media data, and entities will be described as text contained in either the web page or the social media data. However, embodiments are not limited to operating with these types or any other particular types of primary content, supplemental content, and entities. Rather, embodiments may operate to present any suitable type of supplemental content to a user when the supplemental content is detected to be relevant to primary content that the user is experiencing.

Additionally, in examples below, processes and acts are described as being implemented by various facilities that may be implemented together, in a single package. As discussed further below, however, these facilities are merely exemplary of the types of facilities that may be implemented and, additionally, these facilities may be implemented in one or more packages in any suitable combination or division.

FIG. 1 illustrates one process for selecting social media data to be presented to a user based on analyzing a web page to determine content that may be relevant to the user. The process 100 of FIG. 1 is merely exemplary of types of processes that may be implemented, and embodiments are not limited to implementing the process 100 of FIG. 1.

In one embodiment in which the process 100 may be implemented, a user has installed a software package that includes a supplemental content retrieval facility, an entity identification facility, an entity matching facility, and a display facility. The user may then configure—as discussed in greater detail in connection with FIG. 5 below—the supplemental content retrieval facility to retrieve social media data from one or more sources, including from social network services with which the user is affiliated. When the user accesses a web page using a web browser, other facilities may carry out the process 100 to detect which units of social media data, retrieved from the sources, should be presented to the user as relevant social media data.

Process 100 begins in block 102, in which an entity identification facility identifies entities related to the web page that the user has accessed. As discussed above, analyzing a web page to determine the topic of the web page may be useful in determining current interests of the user and thus in determining which social media data may be relevant to the user at that time. To analyze the web page to determine topics, one or more entities that are related to the web page are identified by examining the text of the web page. Entities in the web page may include any nouns referenced by the web page. For example, if the user is viewing a web page that includes a news article, the news article may include the words "Washington" and "Obama." Through the identification of block 102, the entities "Washington, D.C." and "President Barack Obama" may be identified as related to the web page. Exemplary techniques for identifying entities related to a web page are discussed in greater detail below in connection with FIGS. 2, 3A, and 3B.

In block 104, for each unit of social media data (e.g., each message in the social media data) retrieved by the social media data retrieval facility, an identification of entities related to the unit is carried out. Similar to the entities identified in block 102, the entities identified in block 104 may be any nouns referenced by the unit of social media data. For example, if the unit includes the words "DC" and "Obama," the entities "Washington, D.C." and "President Barack Obama" may be identified as related to the unit of social media data. Exemplary techniques for identifying entities related to a web page are discussed in greater detail below in connection with FIG. 4.

The process 100 is carried out to detect social media data that may be relevant to the user, based on the web page that the user is viewing. Accordingly, in block 106, a comparison of entities in the web page and entities in the social media data is carried out to detect the intersection of the sets of entities of the web page and the social media data (e.g., to detect matches in the entities). A match in entities may indicate that units of social media are related to the same topic as the web page and therefore may be relevant to the user.

In some implementations, the comparison of the entities in block 106 may include an exact comparison of the entities related to the web page and the social media data. In other implementations, the comparison of block 106 may additionally or alternatively include a comparison of a category of entities, such as a comparison of a type, topic, or class of entities. Such a categorical comparison may permit more matches to be identified. For example, while an exact comparison of "Nike" and "Adidas" may not identify a match, some categorical comparisons may identify that both are brands of shoes and thus identify a match. Any suitable comparison technique may be used to identify matches.

In block 108, for each entity that is contained in both the web page and in at least one unit of social media data (i.e., for each entity in the intersection), units of social media data are presented to the user as potentially-relevant social media data.

The units of social media data may be presented in any suitable manner, including in a user interface that permits the social media data to be viewed by the user together with the web page, without substantially obstructing the web page or requiring the user to navigate away from the web page. For example, the social media data may be presented in a sidebar interface, displayed alongside the web page. Presenting social media data in this way allows the social media that is relevant to the same topic as the web page to be presented to the user at the same time as the web page, such that the user can experience the web page and the social media data together. This type of interface may be useful where, using the example above, the news article of the web page is describing an announcement by the "President Barack Obama" in "Washington, D.C.," of a new government policy and the social media data includes reactions of friends of the user to the announcement of that policy. Such a presentation enables the user to quickly and easily determine what the relevant facts are and how people the user trusts are reacting to those facts, which allows the user to determine his/her own reaction to the facts. As another example, if the user is viewing a web page for a restaurant, a similar process may be carried out to present to the user social media data relating to the restaurant, including reviews of the restaurant from the user's friends. The user can then view the web page for the restaurant (including, for example, the menu) alongside the social media data, which may aid the user in choosing whether to eat at the restaurant.

Though, any suitable interface may be used to present social media data to the user together with the web page in any suitable way. Examples of user interfaces that may be implemented in some embodiments are discussed in greater detail below in connection with FIGS. 7A and 7B.

In this embodiment, the process 100 may be used for each web page to detect current interests of the user from that web page. Accordingly, once the units of social media data that are possibly relevant to the user's current interests are presented to the user in block 108, the process 100 ends.

By identifying social media data that relates to the same topic (based on a comparison of entities) as a web page that the user is viewing and displaying that identified social media data, the user is able to view relevant social media data without needing to explicitly sort, filter, or search the social media data. The user can therefore be more certain that he/she is viewing the social media data that is important to the user, and may be happy to see the relevant social media data, rather than potentially feeling anxious that he/she is missing potentially relevant information.

The processes and actions that are included in the process 100 of FIG. 1 can be implemented in any of various ways in different embodiments. Discussed below are examples of ways in which some embodiments may implemented these processes and acts. Embodiments are not, however, limited to implementing the process 100 according to any of the examples provided below.

As discussed above, an entity identification facility may be implemented in some embodiments to analyze a web page (or other type of primary content) to identify entities that are related to the web page, including entities referenced by the web page. Identifying entities related to a web page may be carried out in any suitable manner. U.S. patent application Ser. No. 12/270,974 ("the '974 application"), Ser. No. 12/614,457 ("the '457 application"), Ser. No. 12/633,798 ("the '798 application"), and Ser. No. 12/761,666 ("the '666 application") each describe techniques that may be used to analyze web pages (and other types of primary content) and identify entities related to the web pages. In some embodiments, an entity identification facility may operate according to any of the techniques described in these applications or any combination of the techniques described in these applications. Each of the '974 application, the '457 application, the '798 application, and the '666 application is incorporated herein by reference in its entirety, at least for its discussion of identifying entities related to web pages and other types of primary content. Any terminology used in both this disclosure and in any of these applications should be accorded a meaning most consistent with the text of this disclosure.

Figure 2:
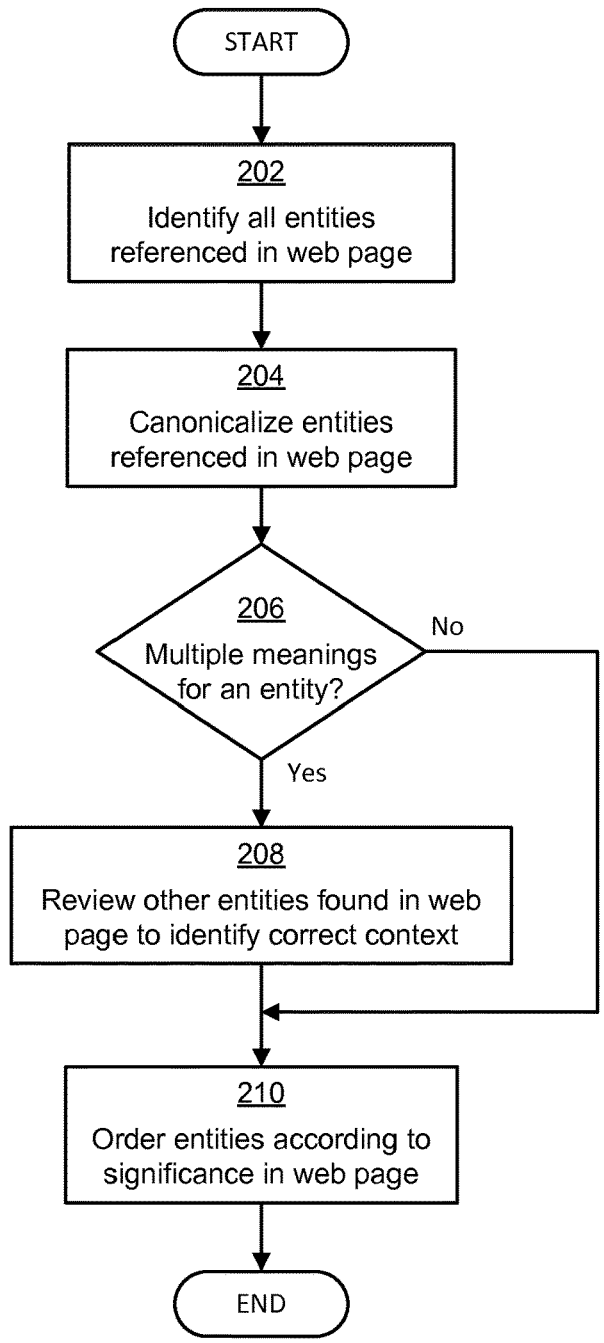
FIG. 2 is a flowchart of one exemplary process for analyzing primary content to determine entities related to the primary content.

FIG. 2 illustrates one process that may be implemented by an entity identification facility in some embodiments for identifying entities related to a web page. Embodiments are not limited to implementing the exemplary process 200, as other processes are possible.

Prior to the start of the process 200, a web page has been selected to be viewed and has been provided to the entity identification facility for analysis. The web page may have already been displayed to the user or may be analyzed by the entity identification facility prior to display to the user.

Process 200 begins in block 202, in which all entities referenced in the web page are identified. Entities may be referenced in the text of the web page, in code of the web page, in metadata of the web page, in content or metadata of elements of the web page (e.g., a frame of the web page, a picture of the web page, a ASP control of the web page, plug-in component of the web page like a Flash element, etc.), or in any other part of the web page.

Any suitable natural language processing, learning, matching, or other technique may be used to identify entities to which a web page relates. In some embodiments, entities may be identified in block 102 when the entities satisfy various parameters. For example, some pieces of metadata may be preconfigured as entities, such as a source of the web page (e.g., an organization or server who provided the web page). As another example, the web page may be compared to a grammar that recognizes phrases in text such that entities may be identified based on the phrases. One such phrase could be for identifying an author, such as the phrase "By_____," where the blank could be satisfied by a name of an author that would be identified as an entity. Similarly, a hyperlink to an email address may satisfy a grammar phrase that results in the email address of the hyperlink being identified as an entity. As another example, formatting of words or phrases may be used to identify entities, such as when the first letter of a word is capitalized or when the word is bolded.

In some embodiments, an external source of entities may be additionally or alternatively used to identify entities in a web page by comparing words or phrases in the web page to words or phrases in the external source. The external source may be any suitable listing of words and phrases, including an external dictionary and/or external encyclopedia. In some implementations, the external source may be an encyclopedia available online, such as the Wikipedia® online encyclopedia. In some such implementations, the listing of entities maintained by Wikipedia® may be downloaded once or periodically and may available to the entity identification facility. The entity identification facility may then identify entities in the web page by comparing the text of the web page to the entities in the Wikipedia® listing.

In block 204, regardless of how the entities are identified in block 202, the entities may be canonicalized to yield a set of root entities. This may be done so that a comparison of entities is done using common terms and will produce correct and complete results and not fail to match two entities because of a slight change in terminology. Canonicalization may comprise identifying a proper name for an entity for which a partial name was given (e.g., "Obama" or "Barack Hussein Obama" to "President Barack Obama"), determining synonyms or categories ("e.g., "tennis shoe" to "athletic shoe"), or determining a root word of an entity referenced in the web page (e.g., "apples" to "apple"). Canonicalization may be carried out in any suitable manner. In some cases, canonicalization may include using a dictionary having links between terms that identify a root term. In the Wikipedia® listing, for example, entities are recognized by multiple different words/phrases but link to one root term that has the definition for the entity. The words or phrases that "redirect" to the one root term may therefore be canonicalized, when they are recognized in the web page, to the root term.

In some cases, canonicalization may include identifying a correct entity for a term before canonicalization can be carried out. This may be the case, for example, with the term "Washington" that could be canonicalized to "George Washington" or "Washington, D.C." Additionally, in some cases a canonicalized term may be associated with multiple entities. This may be the case, for example, with the term "Boston," which may refer to one of multiple different cities and towns, a musical group, a genre of dance, or other entities. To determine a correct topic for a web page, a correct entity should be determined from among the set of possible entities. If an incorrect meaning for an entity was detected, or if no meaning was determined for ambiguous entities, then interests of the user may not be properly determined and irrelevant social media data may be presented to a user.

Identifying entities may therefore include, as a part of canonicalization and/or as a separate act, determining a context for an entity so as to determine a correct entity. FIG. 2 illustrates the contextualizing of entities as a separate act, comprising blocks 206 and 208. For ease of illustration and description below, the blocks 206 and 208 are shown and described as single blocks without a loop, but in some embodiments the process 200 may iterate through each of the entities canonicalized in block 204 to determine whether the canonicalized entities should be contextualized.

In block 206, a canonicalized entity from block 204 is examined to determine whether the entity has multiple meanings The review of block 206 may be carried out in any suitable manner, such as by examining a listing of entities. In some embodiments, including some embodiments that use a Wikipedia® listing of entities to identify entities and/or to canonicalize entities, the Wikipedia® listing may be consulted to determine whether an entity is flagged as ambiguous or includes multiple different definitions. If no entities have multiple meanings, then the process 200 continues to block 210.

However, if a canonicalized entity from block 204 is determined to have multiple meanings, then a context of the entity may be reviewed to determine a correct meaning for the entity. In block 208, other entities identified in the web page are reviewed to determine a context for the ambiguous entity, which may be used to determine a correct meaning for the entity. The other entities may be analyzed to determine whether and how they relate to the ambiguous entity, which may be helpful in determining a correct meaning of the ambiguous entity. In some embodiments that use the Wikipedia® listing of entities, connections between definitions of entities, or entities used in the definition of each meaning of the ambiguous entity, may be used to determine the correct meaning of the entity. For example, if a web page includes many of the other entities that are used in first definition for an ambiguous entity and does not include many of the other entities that are used in a second definition for the ambiguous entity, the web page is more likely to relate to the first definition than the second definition. In reviewing the other entities in block 208, any suitable technique may be used to track the other entities. For example, for each meaning, a count of other entities that are used in defining the meaning and that appear in the web page may be maintained, and the meaning with the highest count may be selected as the correct meaning. As another example, if certain other entities are known to be strongly related to a particular meaning, and those certain entities appear in the web page, more weight may be accorded to that particular meaning In block 210, once entities identified in the web page are canonicalized and contextualized, the entities may be ordered according to their significance in the web page. Ordering the entities according to significance may be helpful in determining a topic of the web page (and thus the user's current interests) by identifying the most significant entities on the web page, which may be more useful in identifying the topic than the least significant entities. A significance of each entity may be determined in any suitable manner based on any suitable metric(s), examples of which are discussed in greater detail below in connection with FIGS. 3A and 3B. In some embodiments, a frequency of use of each entity may be tracked and used to identify the most significant entities, with the entities used more frequently being identified as the more significant entities. In some embodiments, a formatting of entities may be tracked and used to identify the most significant entities, with entities appearing in larger font or bold (for example) being identified as the more significant entities. In some embodiments, the web page may explicitly declare which entities in the page are important or significant using, for example, HTML metadata markup, and the markup may be used in block 210 to identify significant entities and order the entities. Any suitable metric(s) may be used to track a significance of entities.

In some implementations, ordering entities according to significance may also include excluding some entities that are determined not to be significant. For example, a threshold of significance based on any suitable metric may be used to determine whether an entity is important and may be related to the topic of the web page or the user's interests or whether the entity is merely mentioned in the web page and is not noteworthy. Because entities are being used to determine a user's interests and then present social media data based on those interests, entities that are likely to be dismissed by the user as irrelevant may therefore be excluded during the ordering of block 210.

Once the entities are ordered in block 210, the process 200 ends. The entities identified using the process 200 may then be used in any suitable manner, including in selecting social media data to be presented to the user.

As discussed above, the process 200, or any other process for identifying entities, may be implemented by an entity identification facility. Embodiments may implement an entity identification facility in any suitable manner on any suitable computing device, as embodiments are not limited in this respect. In some embodiments, such an entity identification facility may be implemented on a same computing device as the web page is being viewed. In other embodiments, however, because of processing load, user choice, or other considerations, the entity identification facility may be implemented remote from the computing device on which the web page is being viewed. In such embodiments, a first computing device on which the web page is being viewed may transmit the web page or some identifier for a web page (e.g., a URL) to a second computing device implementing the entity identification facility and receive in response a set of entities related to the web page. The second computing device may implement the entity identification facility and may analyze the web page upon receiving the web page or the identifier from the first computing device. In some implementations that use a second computing device, the second computing device may maintain a cache or index of web pages previously or recently analyzed, and may retrieve a previously-identified set of entities for a web page when a web page is detected to have been previously or recently analyzed. It should be appreciated, though, that embodiments are not limited to dividing processing between computing devices in any particular manner, or dividing processing between computing devices at all.

Figure 3A:
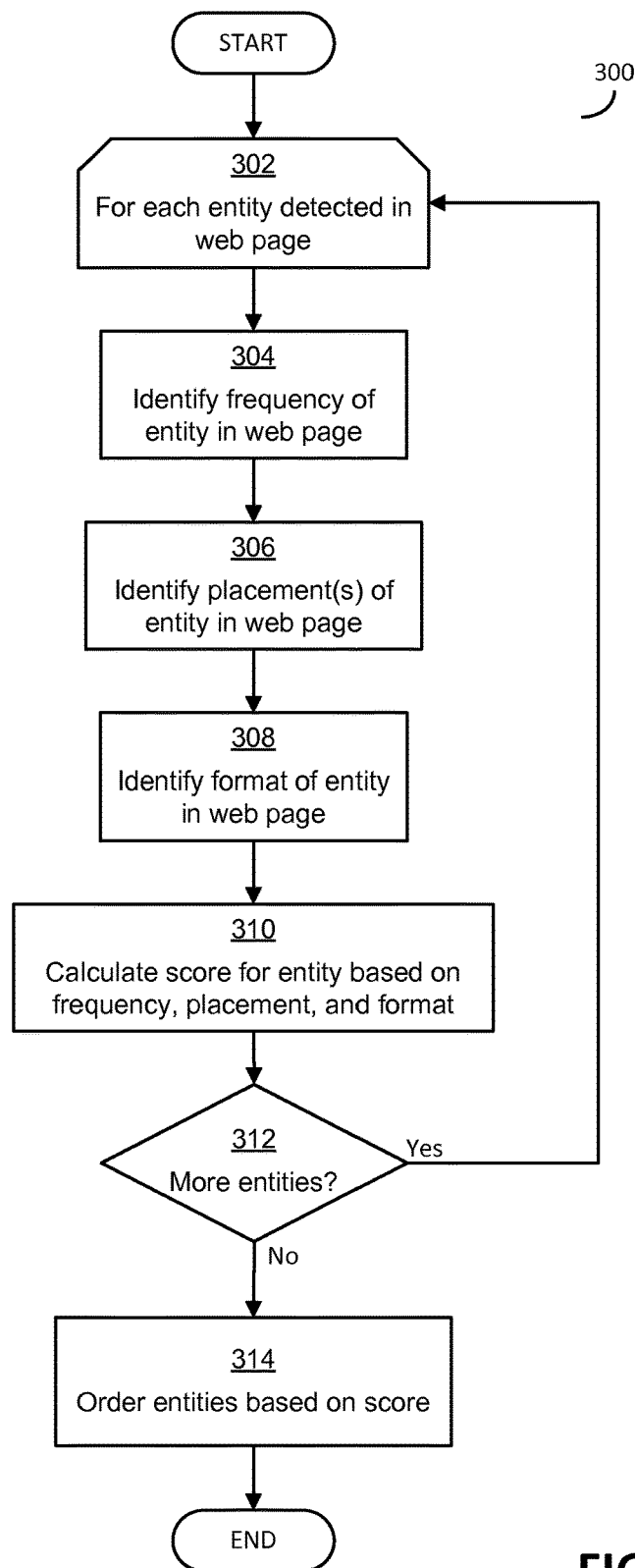
FIGS. 3A and 3B are each flowcharts of exemplary techniques for ordering entities related to primary content according to a significance of the entities.
Figure 3B:
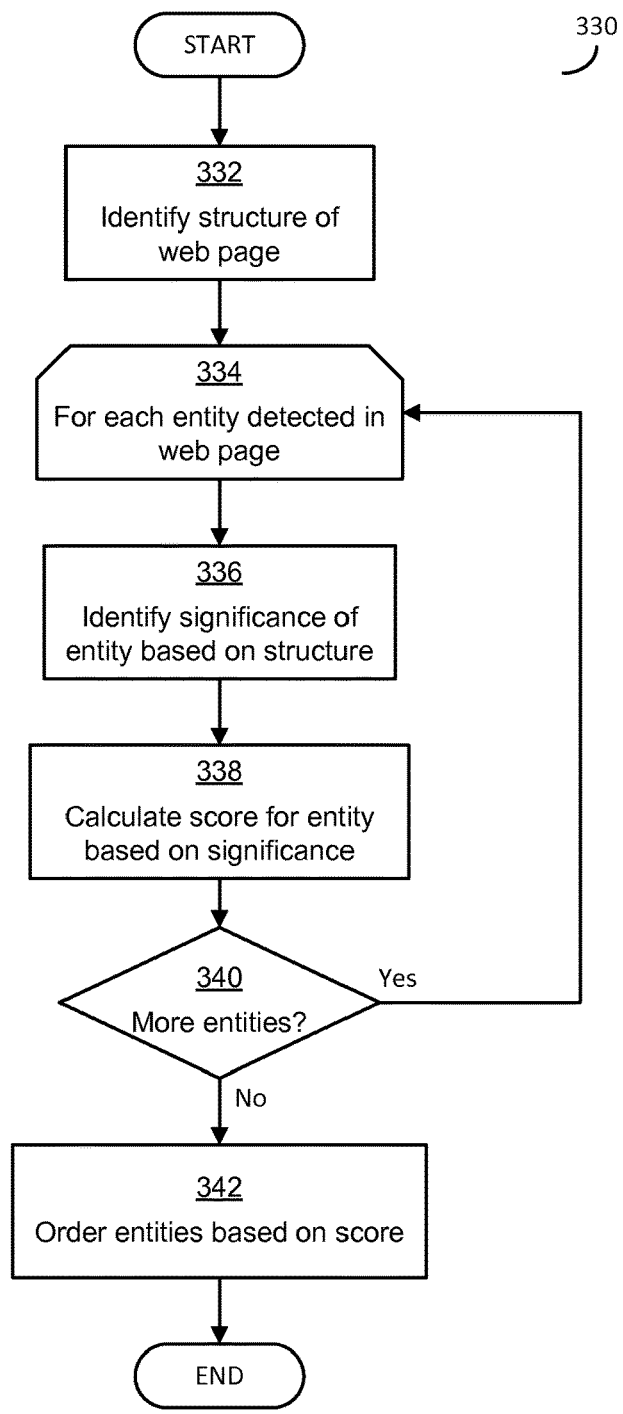

FIGS. 3A and 3B illustrate two exemplary techniques for determining a significance of entities in a web page, based on exemplary metrics. As discussed above, any suitable metric or combination of metrics may be used in different embodiments. Accordingly, embodiments are not limited to implementing either of the processes illustrated in FIGS. 3A and 3B, as others are possible. Further, while the processes of FIGS. 3A and 3B are illustrated as separate processes, some embodiments may implement both processes.

Prior to the start of both processes 300 and 330 of FIGS. 3A and 3B, entities have been identified in web pages and, in some embodiments, may have been canonicalized and/or contextualized. In some, but not all, embodiments, the identification, canonicalization, and contextualization may be carried out as discussed above in connection with blocks 202-208 of FIG. 2.

Process 300 of FIG. 3A begins in block 302, in which a loop is started that examines each entity detected in a web page. Within the loop, various characteristics of the entity and the web page are examined to determine a significance of the entity in the web page.

In block 304, a frequency of use of the entity in the web page is determined. The frequency of use may be determined by counting a number of times the entity is used in the web page. The number of times the entity is used may be a count of the number of times the canonicalized entity is used, such that the count may include the number of times each of multiple different forms of the entity are used in the web page. In some cases, one or more thresholds may be used in connection with a frequency of use of entities, such that entities that surpass the thresholds in frequency (e.g., used more than 5 times, or used more than 20 times in the web page) are accorded extra significance. For example, once the frequency of such items exceeds the threshold, extra uses may be added to the frequency score, to weight the entity further. As an alternative, a frequency of use may be compared to one or more thresholds to determine a frequency score for the entity, such that an entity used fewer than a threshold number of times is assigned one frequency score (e.g., 0.4) and an entity used more than a threshold number of times is assigned a second, higher frequency score (e.g., 0.9).

In block 306, a placement of the entity of the web page may be identified, which may include a placement for each use of the entity in the web page. The placement of the entity may be used to determine significance based on inferring that more significant entities may appear at a top of a web page and less significant entities may occur at a bottom of a web page. For entities that are used multiple times, identifying a placement of an entity in block 306 may comprise identifying a topmost placement of the entity, a bottommost placement, an average placement based on examining all placements, or any other suitable placement. In some embodiments, a placement score may be calculated for an entity from each placement, based on scores/weights associated with placements in web pages. A summing, multiplying or other mathematical operation may be carried out based on scores/weights to determine an overall placement score for an entity.

In block 308, a format of an entity in the web page may be identified, which may include a format for each use of the entity in the web page. The format of the entity may be used to determine significance based on inferring that more significant entities may appear in larger font (e.g., as titles or headers) or in bold, or similar emphasized in some way using formatting. For entities that are used multiple times, identifying a format of an entity in block 306 may comprise identifying a most emphasized formatting, a least emphasized formatting, an averaging formatting, or another other formatting, based on information or metrics relating emphasis to formatting. In some embodiments, a formatting score may be calculated for an entity from each formatting, based on scores/weights associated with formatting in a web page. A summing, multiplying, or other mathematical operation may be carried out based on scores/weights to determine an overall formatting score for an entity.

In block 310, based on the frequency, placement, and format of the entity, an overall significance score for the entity is calculated. The overall score may be calculated in any suitable manner. In some embodiments, the overall score may be based on an analysis of results of the identifications of block 304, 306, and 308. In other embodiments, the overall score may be calculated by performing a calculation on numerical results of the identifications of block 304, 306, and 308.

In block 312, a determination is made whether more entities remain to be analyzed. If so, process 300 returns to block 302 to select another entity and analyze the significance of that entity. If there are no more entities to consider, then in block 314 the entities are ordered according to the overall significance scores calculated for each in block 310. As discussed above, in some implementations, the ordering of block 314 may include eliminating some entities that are determined not to be significant, such as entities with an overall significance score below a specified threshold.

Once the entities are ordered in block 314, the process 300 ends.

FIG. 3B shows another exemplary process 330 that may be additionally or alternatively used in some embodiments to identify a significance of entities related to a web page. As discussed further below, process 330 determines a significance of an entity based on the entity's relationship to the structure of a web page.

In block 308 of FIG. 3A, a placement of an entity in a web page was used to determine a significance of the entity. However, it should be appreciated that some entities that occur near a top of a web page may not be significant to the content of the web page. This may particularly be the case if the position of the entity in the code of the web page (e.g., the HyperText Markup Language (HTML) code of the web page), which may not directly correspond to the position of the entity in the web page as rendered. This may be because navigation menu items that offer links to other web pages may appear near the top of a web page or near the top of code of a web page, but the navigation menu items may be unrelated to the content of the web page. Rather, the navigation menu items could be static and unchanging elements between different web pages of a web site, as part of a template for the web site. Because such navigation menu items are static and unchanging, they may not directly relate to the content of the web page being viewed, and thus may not be relevant to the user and not relevant in selecting relevant social media data to present to the user. According any significance to static and unchanging navigation menu items may be imprudent, and according special significance to them for appearing near the top of the web page may be further imprudent.

Analyzing a structure of a web page may therefore aid in identifying the main content of the web page and in identifying sections of the web page that are not main content, which may be used to determine a significance of the entity in the web page.

The process 330 begins in block 332, in which the web page is analyzed and a structure of the web page identified. Identifying the structure of the web page may comprise identifying different sections of a web page based on an analysis of the code of the web page. For example, if the code indicates that a particular section of code and content is merely a list of words/phrases, those word phrases may be inferred to be a navigation menu or other list that is irrelevant to the main content of the page. In an HTML web page, such a list may be identified by looking for repeated "div" tags that have the same style and similar composition. Such a technique may also be useful in identifying longer sets of content as irrelevant to the content of the page, such as where a web page that includes a blog may include a list of "comments" on the blog entry. When the code is examined, a lengthy set of text that does not include many commands may be identified as the main content of the web page, which may be considered to be more significant than other content. In some embodiments and for some web pages, an analysis of the structure may identify other files that may also be considered, such as style sheets. The style sheets may identify a formatting for text of the web page and may thus be useful in identifying a significance of some entities. Additionally or alternatively, examining a structure of a web page may lead to a determination of how the web page will appear when rendered, which may allow for a better determination of a relevance of an entity from a placement of an entity in the rendered web page. The analysis of the structure of the web page may be carried out in any suitable manner.

Regardless of the manner in which the web page is analyzed to determine the structure, in block 334 a loop is started that examines each entity identified as related to the web page. In block 336, a significance of an entity is identified based on the structure. The significance may be determined from the structure in any suitable manner. For example, entities that are used in a title of the web page (e.g., the metadata title or a title as appears in a rendered page) may be rated as more significant than entities that are not in a title. As another example, entities that appear within a block of text identified as the main content may be determined to be more significant than entities that appear outside of that block. As another example, entities that appear in a list, such as a list of navigation menu items or a list of comments, may be determined to be less relevant than other entities. As another example, entities that are determined to appear near a top of a rendered page may be identified as more significant than entities that appear near a bottom of a rendered page.

In block 338, a score is calculated for the entity based on the significance of the entity determined in block 336. For entities that appear multiple times, the score may be calculated based on a highest significance, a lowest significance, an average significance, or any other measure of significance.

In block 340, a determination is made whether more entities remain to be analyzed. If so, process 330 returns to block 334 to select another entity and analyze the significance of that entity. If there are no more entities to consider, then in block 342 the entities are ordered according to the overall significance scores calculated for each in block 338. As discussed above, in some implementations, the ordering of block 342 may include eliminating some entities that are determined not to be significant, such as entities with an overall significance score below a specified threshold.

Once the entities are ordered in block 342, the process 330 ends.

Embodiments are not limited to considering only frequency, placement, formatting, and structure in determining significance. Rather, any suitable metric may be used. In some embodiments, information not directly related to an entity may be used in block 310 to calculate a significance score for an entity. For example, interests of a user may be used in calculating a significance score for an entity, including general interests of a user and specific interests of a user detected from the primary content (e.g., the web page). If a user is detected to generally be interested in a particular topic, then entities related to that particular topic may be treated differently from other entities. In some embodiments, for example, entities related to a user's general interests may be considered to be more significant than entities related to a user's current interests that may be only passing interests. This may be done because the user's general interests may be more relevant to the user than merely the user's passing interests. As another example, when entities are broadly related to a user's general interest, the entities may be determined to be less significant than entities specifically related to a user's general interest. This may be because a user may be presumed to be familiar with the area of user's general interest and so may already be familiar with entities or topics that are only broadly or generally related to the interest, but may not be familiar with a specific topic or specific piece of information. Information with which the user is not familiar may be more interesting to the user and therefore may be more significant. Similarly, if a user is an expert in a particular area, the user may not be interested in entities or topics that are simple or intended for novices in that particular area, as the user may already be familiar with those entities or topics or may find those entities or topics boring. Conversely, if a user is a beginner in a particular area, the user may not be interested in entities or topics that are intended for experts, because the user may not be able to understand the entities or topics. Accordingly, a degree of interest or a degree of skill in a topic may be used to determine a significance of entities related to the topic.

In embodiments where information about a user's general interests or skills is used in calculating a significance score of an entity, any suitable techniques may be used to determine a user's interests or skills. For example, a user may explicitly provide input to a system regarding the user's interests or skills. As another example, the user may consent to his/her interests or skills being monitored or tracked, after which a user's general interests may be inferred from detecting interests reappearing over time in web pages (or other primary content) accessed by the user.

A skill level of the user in a particular area may be inferred over time from comparing entities used in web pages (or other primary content) to known resources regarding a topic, including beginner texts and advanced text about the topic, to determine whether web pages more closer relate to the beginner texts or to the advanced texts. Any suitable textual analysis technique may be used to perform such a comparison. A skill level of an entity appearing in a web page may be resolved and used in block 310 to calculate a significance in a similar manner, by comparing the entity (and/or other entities related to the web page) to beginner and/or advanced texts or other resources regarding a topic.

Additionally or alternatively, in some embodiments information about social media data to which entities relate may be used to determine a significance of the entities in block 310. For example, when an entity related to a web page appears in a larger number of units of social media data, the entity may be determined to be more significant than an entity appearing in a smaller number of units of social media data. As another example, sources of units social media data to which an entity relates may be considered. Units of social media data originating from a particular social network service may be considered more significant than units of social media data originating from other social network services. Significance of social network services may be determined in any suitable manner, including based on user input or based on detection of user interactions with units of social media data originating from social network services. Accordingly, entities appearing in the web page that also appear in social media data originating from significant sources may be determined to be more significant than other entities appearing in the web page. Additionally or alternatively, a user of a social network service that created a unit of social media data may be considered in determining a significance of an entity based on a source of social media data relating to the entity. Units originating from other users to whom the user has strong connection or whom the user trusts may be more significant than other units of social media data. A degree of closeness or trust between users may be determined in any suitable manner, including by determining an amount of interaction between the users in the social network service or based on explicit user input. Accordingly, entities appearing in the web page that also appear in social media data originating from these close or trusted users may be determined to be more significant than other entities appearing in the web page.

Identifying entities related to a web page and their significance may be useful, in embodiments, for selecting units of social media data to be presented to the user as potentially-relevant social media data. The units of social media data that are presented are those that may relate to the same topic as the web page that the user is currently viewing.

Accordingly, in some embodiments, units of social media data may be analyzed to determine entities to which each unit relates, such that units of social media data that relate to the same entities as the web page may be presented to the user. Embodiments may examine social media data in any suitable manner to identify entities to which units of social media data relate. In some implementations, an entity identification facility that is used to identify entities related to web pages may also be used to identify entities related to units of social media data. In other implementations, however, a different entity identification facility using a different entity identification technique may be used. A different facility and different technique may be used, for example, where a technique used for a large amounts of text in a web page is not well adapted for use with small amounts of text in social media data, and a different technique that is well-adapted for social media data may be used instead.

Identifying entities related to units of social media data may be carried out in any suitable manner. The '974 application, the '457 application, the '798 application, and the '666 application (referenced above) each describe techniques that may be used to analyze social media data (and other types of supplemental content) and identify entities related to the social media data. In some embodiments, an entity identification facility may operate according to any of the techniques described in these applications or any combination of the techniques described in these applications to identify entities related to social media data. Each of the '974 application, the '457 application, the '798 application, and the '666 application is incorporated herein by reference in its entirety, at least for its discussion of identifying entities related to social media data and other types of supplemental content. Any terminology used in both this application and in any of these applications should be accorded a meaning most consistent with the text of this application.

Figure 4:
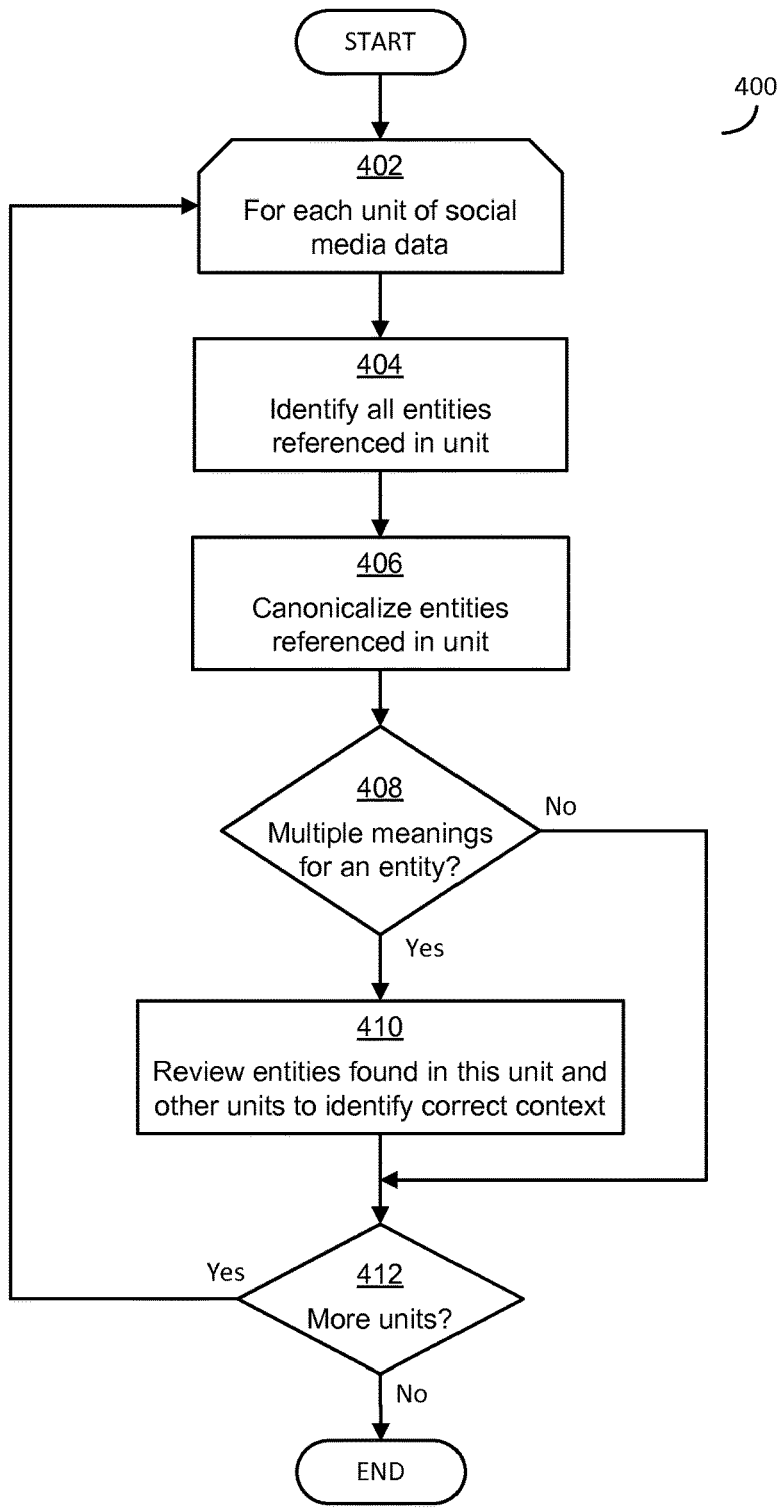
FIG. 4 is a flowchart of one exemplary process for analyzing supplemental content to determine entities related to the supplemental content.

FIG. 4 illustrates one process that may be implemented by an entity identification facility in some embodiments for identifying entities related to social media data. Embodiments are not limited to implementing the exemplary process 400, as other processes are possible.

Prior to the start of the process 400, social media data may have been made available to the entity identification facility, including by being received at a computing device implementing the entity identification facility. The social media data may originate from any suitable source and be received in any suitable manner, examples of which are discussed in greater detail below in connection with FIG. 5.

Process 400 begins in block 402, in which a loop begins that examines each unit of social media data available to the entity identification facility.

In block 404, all entities referenced in the unit of social media data are identified. The entities may be identified in any suitable manner, including according to exemplary techniques described above in connection with block 202 of FIG. 2. For example, a listing of entities available from an external source (e.g., Wikipedia®) may be used to identify entities. Entities may be identified in any suitable part of a unit social media data, including both in the data of a unit and in metadata of a unit. For example, a word or phrase used in a unit (e.g., a word or phrase used in a message or in a caption of a picture or video) may be identified as an entity, a person creating a unit may be identified as an entity, a location at which a unit was created (e.g., a geographic location) may be identified as an entity, or any other suitable information contained within a unit of social media data may be identified as an entity.

In block 406, the entities identified in block 404 are canonicalized. The canonicalization may be carried out in any suitable manner, including according to exemplary techniques described above in connection with block 204 of FIG. 2. For example, the listing of entities available from the external source may be used to identify a root entity for each entity identified in block 404.

As discussed above in connection with FIG. 2, canonicalization may include identifying a correct entity for a term before canonicalization can be carried out. This may be the case, for example, with the term "Washington" that could be canonicalized to "George Washington" or "Washington, D.C." Additionally, in some cases a canonicalized term may be associated with multiple entities. This may be the case, for example, with the term "Boston," which may refer to one of multiple different cities and towns, a musical group, a genre of dance, or other entities. To properly relate social media data to a user interests (based on the analysis of the web page, as discussed above), a correct entity should be determined from among the set of possible entities. If an incorrect meaning for an entity was detected, or if no meaning was determined for ambiguous entities, then interests of the user may not be properly determined and irrelevant social media data may be presented to a user.

Identifying entities may therefore include, as a part of canonicalization and/or as a separate act, determining a context for an entity so as to determine a correct entity. FIG. 4 illustrates the contextualizing of entities as a separate act, comprising blocks 408 and 410. For ease of illustration and description below, the blocks 408 and 410 are shown and described as single blocks without a loop, but in some embodiments the process 400 may iterate through each of the entities canonicalized in block 406 to determine whether the canonicalized entities should be contextualized.

In block 408, a canonicalized entity from block 406 is examined to determine whether the entity has multiple meanings The review of block 408 may be carried out in any suitable manner, such as by examining a listing of entities. In some embodiments, including some embodiments that use a Wikipedia® listing of entities to identify entities and/or to canonicalize entities, the Wikipedia® listing may be consulted to determine whether an entity is flagged as ambiguous or includes multiple different definitions. If no entities have multiple meanings, then the process 400 continues to block 412.

However, if a canonicalized entity from block 406 is determined to have multiple meanings, then a context of the entity may be reviewed to determine a correct meaning for the entity. In block 410, other entities identified in the unit of social media data may be reviewed to determine a context for the ambiguous entity, which may be used to determine a correct meaning for the entity. This review of other entities may be carried out in any suitable manner, including according to techniques described above in connection with block 208 of FIG. 2. In some embodiments, a unit of social media data may be too short to include other entities, or may not include enough other entities for an entity to be disambiguated. In such cases, other units of social media data that are related in some way to the unit may be analyzed. For example, other units of social media data that were created by a same person (e.g., other messages from another user of a social network service) may be analyzed to determine other entities referenced in those units of social media data. As another example, units of social media data generated by others but that are related in some way to the unit (e.g., responses to messages, or comments on pictures) may be analyzed to determine other entities referenced in those units. As another example, other units of social media data that include the currently-selected entity may be analyzed to determine other entities referenced in those units. The other units of social media data may be helpful, as units generated by a same person, units generated as responses or that are otherwise related, or units that were generated by another person within a same group of people may be likely to be related to the same topic. Accordingly, the other entities referenced by these other units of social media data may be helpful in determining a correct meaning for an ambiguous entity related to the currently-selected unit of social media data. These other entities may be used in any suitable manner, including according to techniques described above in connection with block 208 of FIG. 2.

Once all entities of a unit are identified, canonicalized, and contextualized, in block 412 a determination is made regarding whether additional units of social media data are available for analysis. If so, the process 400 returns to block 402 to select and analyze another unit of social media data. If no more units exist, however, the process 400 ends.

After the process 400 ends, units of social media data and the entities identified as related to those units may be used in any suitable manner. In some embodiments, an index may be created for the social media data based on entities, that indexes units of social media data based on the entities to which they relate. Additionally, the set of social media data may be queried, as discussed in greater detail below in connection with FIG. 6, to determine units of social media data that relate to particular entities and that may be presented to the user as relevant to the user at that time.

Figure 5:
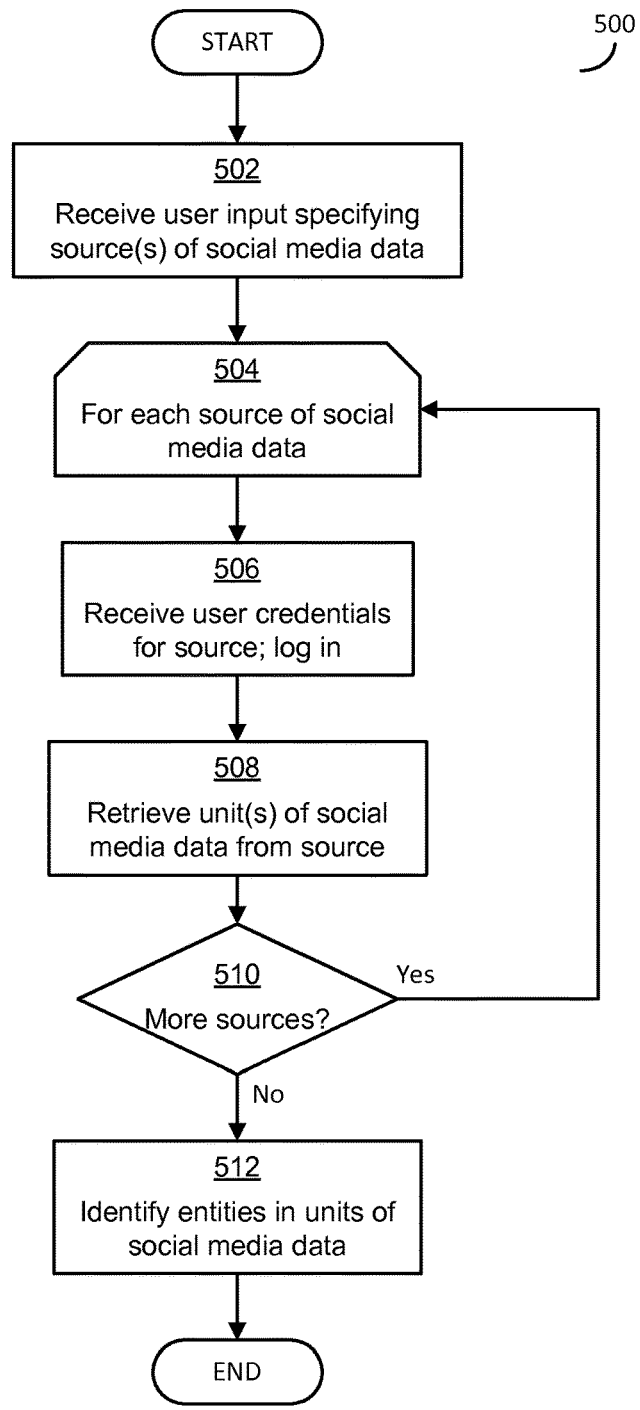
FIG. 5 is a flowchart of one exemplary process for obtaining supplemental content for analysis.

As discussed above, social media data may be received from any suitable source. FIG. 5 shows one process that may be carried out in some embodiments for identifying sources of social media data and retrieving social media data from the sources. Embodiments are not limited to implementing the process 500 of FIG. 5, however, as other processes are possible.

Process 500 begins in block 502, in which user input is received that specifies at least one source of social media data that the user would like to have processed using techniques described herein to determine relevant social media data. The user may specify any suitable source of social media data in any suitable manner. For example, the user may specify particular social network service with which the user has an account (e.g., Facebook®, Twitter®, and others). In some embodiments, a supplemental content retrieval facility may be preconfigured regarding how to contact some popular social network services to retrieve data, including the particular locations from which to retrieve data and the particular protocols to communicate to the services using. In other embodiments, a user may specify locations from which to retrieve data and protocols to use.

In block 504, a loop is started for each source of social media data that the user identified in block 504. In block 506, for a particular source of social media data, any necessary user credentials may be received for the source (e.g., user and password) and the credentials are used, where necessary, to log in to the service. In block 508, at least one unit of social media data is retrieved from the source by a supplemental content retrieval facility and stored by the facility to be processed in any suitable manner.

In block 510, a determination is made regarding whether any other sources of social media data remain to be processed. If so, then process 500 returns to block 504 to select another source of social media data. If not, then process 500 continues to block 512 where the retrieved units of social media data are made available to be analyzed to determine entities to which each unit relates. Once the entities have been examined in block 512, the process 500 ends.

As discussed above, the process 400, or any other process for identifying entities, may be implemented in an entity identification facility. Embodiments may implement an entity identification facility in any suitable manner on any suitable computing device, as embodiments are not limited in this respect. In some embodiments, such an entity identification facility for the social media data may be implemented on a same computing device as the web page is being viewed. In other embodiments, however, because of processing load, user choice, or other considerations, the entity identification facility may be implemented remote from the computing device on which the web page is being viewed.

Accordingly, a supplemental content retrieval facility may be similarly implemented on a same computing device as the web page is being viewed or on a separate computing device. Implementing the supplemental content retrieval facility may be important in some embodiments for privacy considerations. Implementing the supplemental content retrieval facility on the same computing device as the web page is being viewed may assist in ensuring the confidentiality or privacy of social media data, as the social media data is only retrieved by a computing device that the user is operating. In other embodiments, though, for the reasons listed above, a supplemental content retrieval facility and an entity identification facility may be implemented on a remote computing device. In such embodiments, a first computing device on which the web page is being viewed may receive the user specifications of the social media data to be analyzed and transmit the specifications to a second computing device implementing the supplemental content retrieval facility. The second computing device may then retrieve the social media data and carry out the entity identification using the entity identification facility, and then provide the social media data and the entities to the first computing device. Though, embodiments are not limited to dividing processing between computing devices in any particular manner, or dividing processing between computing devices at all.

As discussed above, techniques described herein are useful for determining relevant social media data to be presented to a user based on an analysis of topics that are currently relevant to a user. Topics currently relevant to a user may be determined based on an identification of entities related to a web page (or other type of primary content) that a user is currently viewing. Social media data may be determined to be relevant to a user when the social media data relates to the same entities as the web page, as the social media data may be inferred to relate to the same topics and be relevant to the user for that reason.

Figure 6:
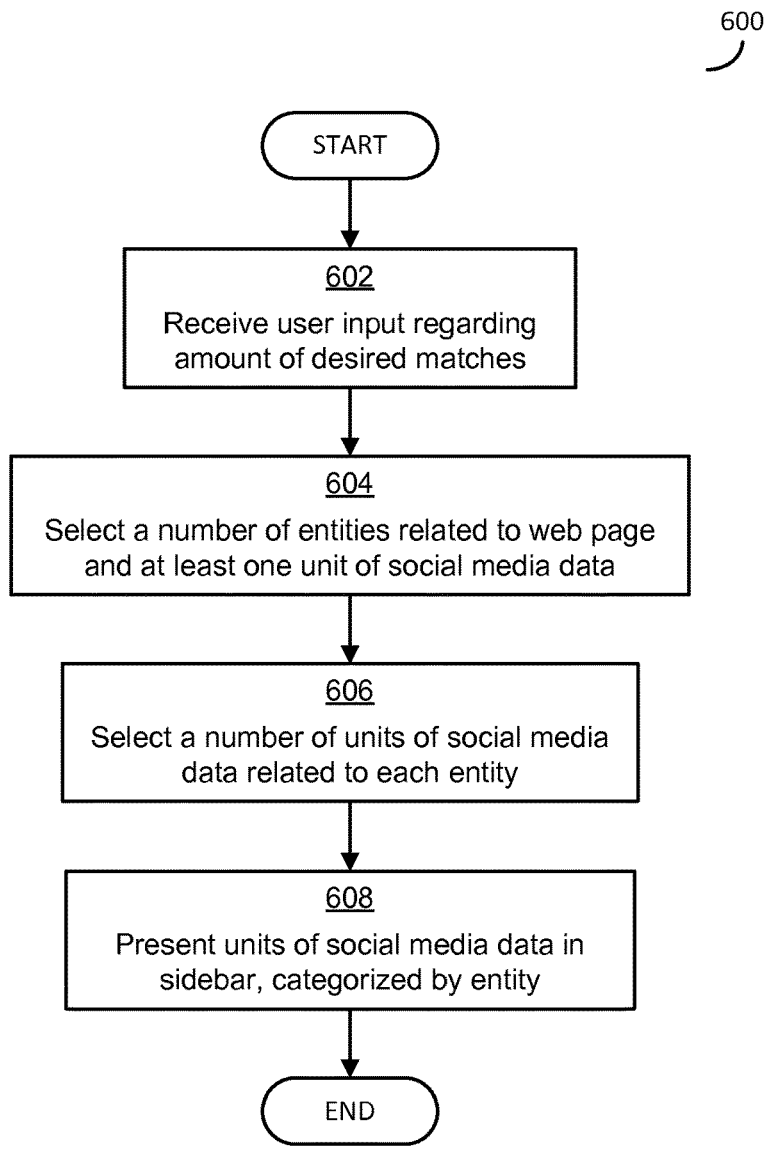
FIG. 6 is a flowchart of one exemplary process for presenting supplemental content to a user together with primary content.

FIG. 6 shows one exemplary process that may be used for selecting social media data to be presented to a user based on entities identified in both a web page and in social media data. Embodiments are not limited to implementing the process 600 of FIG. 6, as others are possible.

Process 600 begins in block 602, in which user input regarding a desired number of matches is received. The user input may specify a specific number of desired matches or may specify a range or relative amount (e.g., "more" or "less"), or may specify a desired number in any other manner. The user input of block 602 may aid the user in not feeling overwhelmed by an amount of social media data presented to the user or in identifying the most relevant social media data to be viewed.

In block 604, a number of entities that are related to the web page and to at least one unit of social media data are selected. Selecting entities that relate to both the web page and the at least one unit of social media data ensures that entities for which social media data is actually available are presented to a user and that a satisfactory number of entities are presented. The entities selected may be the top entities in an ordering of entities according to significance in the web page or may be any other set of entities.

The entities that relate to both the web page and at least one unit of social media data may be identified in any suitable manner. In some embodiments that maintain an index of entities related to units of social media data, an entity matching facility may, for each entity identified as related to the web page, query an index for the units of social media data to determine whether the index includes the entity and/or the entity is related, according to the index, to at least one unit of social media data.

In block 606, for each of the entities selected in block 604, a number of units of social media data that relate to that entity are selected. The units of social media data may be selected in any suitable manner. For example, units created most recently may be selected first and units created farthest in the past may be selected last. As another example, units that relate to multiple entities selected in block 604 may be selected first, as these units may be inferred to be the most relevant to the user. As another example, previous user interaction with social media data presented in this way may be used, such as where a user indicated a response to units from certain people or units with other certain characteristics. Any suitable metrics may be used in any suitable manner to select units of social media data in block 606, as embodiments are not limited in this respect.

The units of social media data may be selected in any suitable manner. In some embodiments, any suitable query may be conducted of a data store that includes the units of social media data, including a query of one or more indices maintained by the social media data or a query of the units of social media data themselves that may be carried out as an analysis of the social media data. The manner of selecting the units in block 606 may vary based on how the units of social media data are stored (e.g., as individual units stored separately in a storage medium, as data in a markup file, as data in a relational database, etc.).

In block 608, the units of social media data selected in block 606 are presented to the user categorized by an entity to which they relate in any suitable interface. Where units of social media data relate to multiple entities, the entity may be categorized multiple times, by each entity, or any suitable factors may be used to determine an entity by which to categorize a unit. For example, units may be categorized by the most significant entity (e.g., most significant in the web page) to which they relate. As another example, units may be categorized according to the entity used most frequently or used first in the unit of social media data. Any suitable factors may be used to categorize units by entity, as embodiments are not limited in this respect.

The units of social media data may be presented to the user in any suitable interface, including as a sidebar that enables the social media data to be displayed together with the web page. In some embodiments, the user interface that displays the social media data may be a part of the web browser a user is using to view a web page.

Figure 7A:
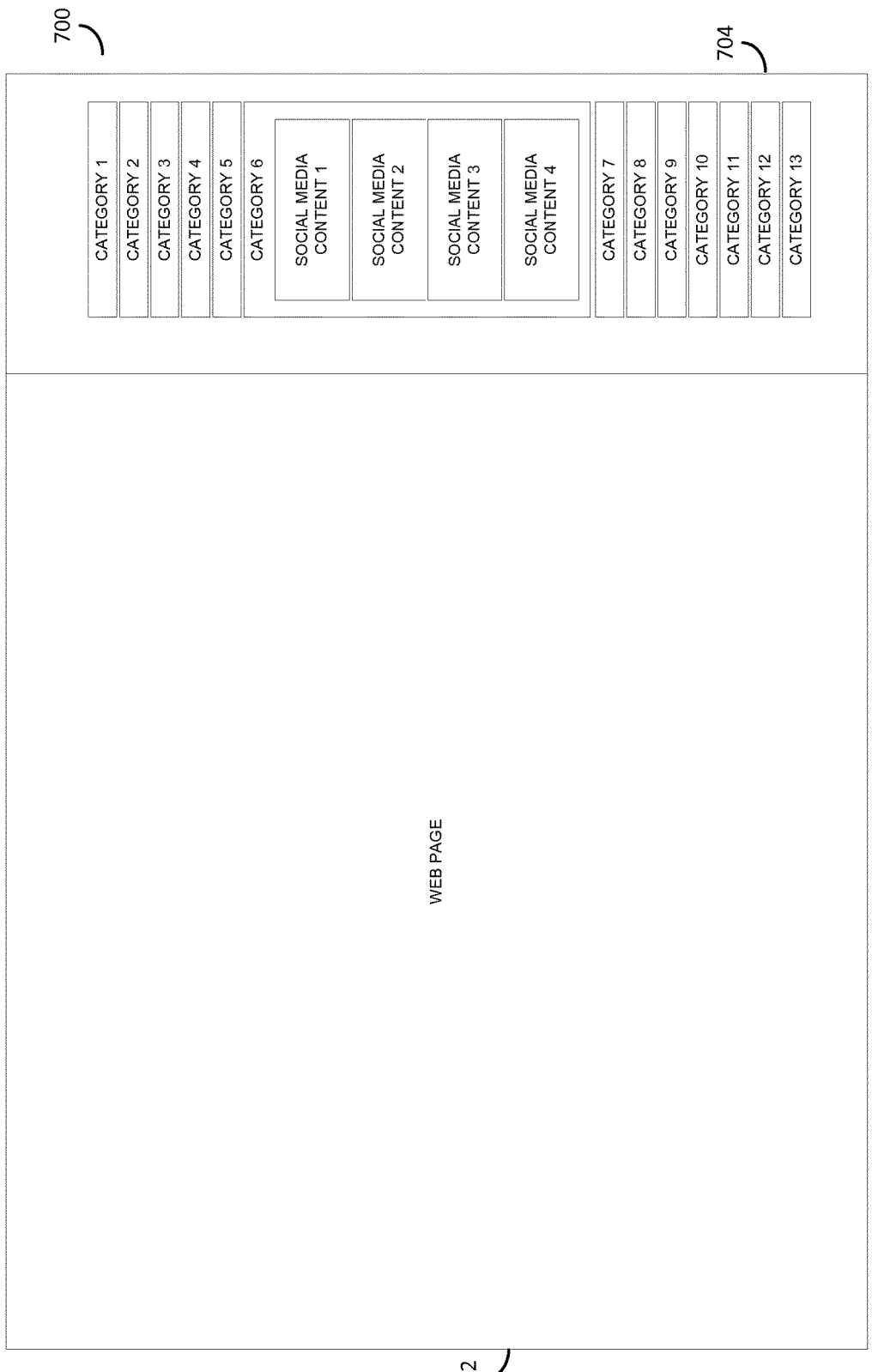
FIGS. 7A and 7B are screenshots of exemplary user interfaces that may be used in some embodiments.
Figure 7B:
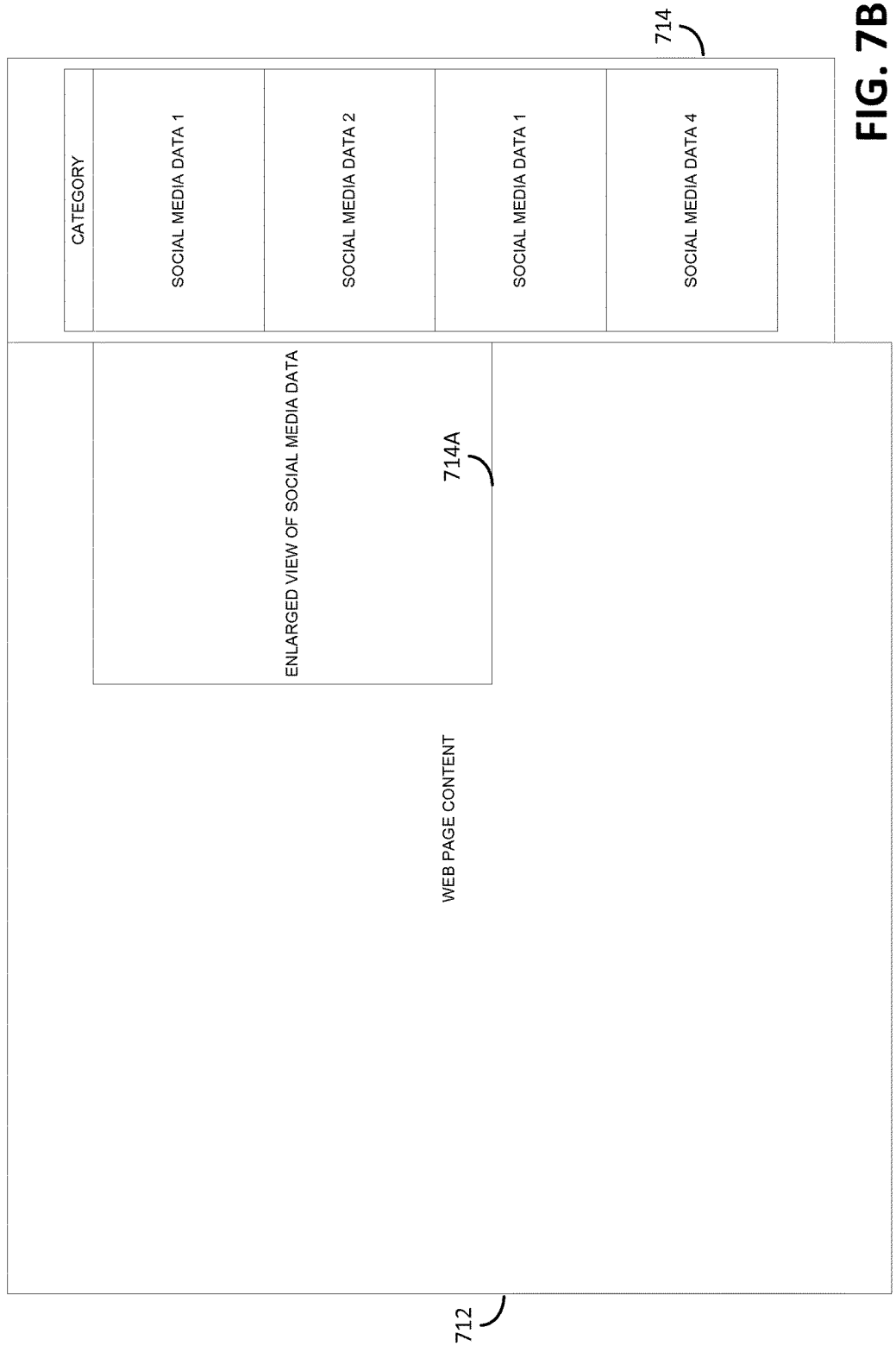

FIGS. 7A and 7B show examples of user interfaces that may be used in some embodiments in block 608 to present social media data to a user together with a web page. The user interfaces illustrated in FIGS. 7A and 7B may be used in embodiments that implement the user interface as a part of a web browser. Embodiments that implement the user interface outside of the web browser (or any other application for experiencing primary content) may use any other suitable user interface.

The user interface 700 includes two regions 702 and 704. Region 702 displays the web page that the user is currently viewing while region 704 displays a list of social media data that may be relevant to the user. The list of social media data is shown in the region 704 as categorized based on entity, with each category expandable to see the units of social media data related to that entity. The category "Category 6" is shown expanded in the region 704, with four units of social media content also shown under that category. For each unit, a user that created the unit is identified and a picture is shown, in addition to the content of the unit.

In an exemplary embodiment, the web page shown in the region 702 includes an article about a professional athlete (e.g., "professional athlete"), who was detected as an entity to which the web page relates. The region 704 includes a category "professional athlete" that, if expanded, lists pieces of social media data that also relate to the entity and that have been determined to be potentially relevant to the user.

FIG. 7B shows another example of a user interface that also includes two regions: a web page region 712 and a social media data display region 714. In an exemplary embodiment, the web page may include an article about Chile, and Chile can be identified as an entity to which the web page relates. The social media data listed in the region 714 therefore includes social media data related to the entity Chile, which is shown expanded in the region 714 with 4 units of social media data shown as blurbs. For each of the blurbs categorized under Chile, a person who created the unit of social media data is identified and picture is shown, the time at which the unit was created is identified, and the content of the unit of social media data is shown. Additionally, an enlarged view 714A of one particular unit of social media data is shown that shows the content of the blurb in larger font and may, in some cases, show more of the content that was shown in the blurb. A user may access the enlarged view 714A by clicking on one of the blurbs shown in the region 714. The enlarged view 714A may additionally provide the user ways to interact with the unit of social media content, such as by indicating that the user "likes" the unit (which may create a message to be shared in a social network service), creating a reply to the unit of social media content, or sharing the unit of social media content with others by creating a new message including the unit of social media content.

Regardless of the interface used to present units of social media content in block 608, once the units of social media content are presented in block 608, the process 600 ends.

As discussed above, in various examples described herein primary content is described as a web page and supplemental content is described as social media data. However, embodiments are not limited to operating with these types of primary and supplemental content or any other particular types of primary and supplemental content. Rather, as discussed above, primary content may include any type of electronic content that a user is presently or was recently experiencing, and supplemental content includes any distributed information to which the user has subscribed. Other examples of primary content include word processing documents, emails, instant messages, photographs, and videos. Other examples of supplemental content include entries in an RSS feed (e.g., blog entries), emails, instant messages, and photographs.

Techniques operating according to the principles described herein may be implemented in any suitable manner. Included in the discussion above are a series of flow charts showing the steps and acts of various processes that select supplemental content to be displayed to a user when the supplemental content is potentially relevant to the user, based on an analysis of primary content that the user is experiencing. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit, or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete, stand-alone software package, for example as a software program application such as Microsoft® Shimmer. These functional facilities may, in alternative embodiments, be adapted to interact with other, unrelated functional facilities and/or processes, to implement a software program application. In some such alternative embodiments, the functional facilities may be implemented as a plug-in, optional component, or other add-on to an application program. The functional facilities may be implemented as an add-on to, for example, a web browser such as Microsoft® Internet Explorer® (e.g., the Microsoft® Shimmer plug-in to Internet Explorer®), an e-mail client such as Microsoft® Outlook®, a word processing client such as Microsoft® Word, a photo processing application such as Microsoft® Windows® Photo Gallery, or as an add-on to any other suitable application. In other implementations, the functional facilities may be adapted to interact with other functional facilities in such a way as form an operating system, including the Windows® operating system, available from the Microsoft® Corporation of Redmond, Wash. In other words, in some implementations, the functional facilities may be implemented alternatively as a portion of or outside of an application program or operating system.

In some embodiments where the functional facilities are implemented as a stand-alone application or as a part of an operating system, the functional facilities may detect primary content that the user is experiencing by monitoring other applications with which the user is interacting. In some embodiments where the functional facilities are implemented as an add-on to an application, the functional facilities may detect primary content that the user is experiencing by monitoring the application to which the facilities are added.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 806 of FIG. 8 described below (i.e., as a portion of a computing device 800) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 9:
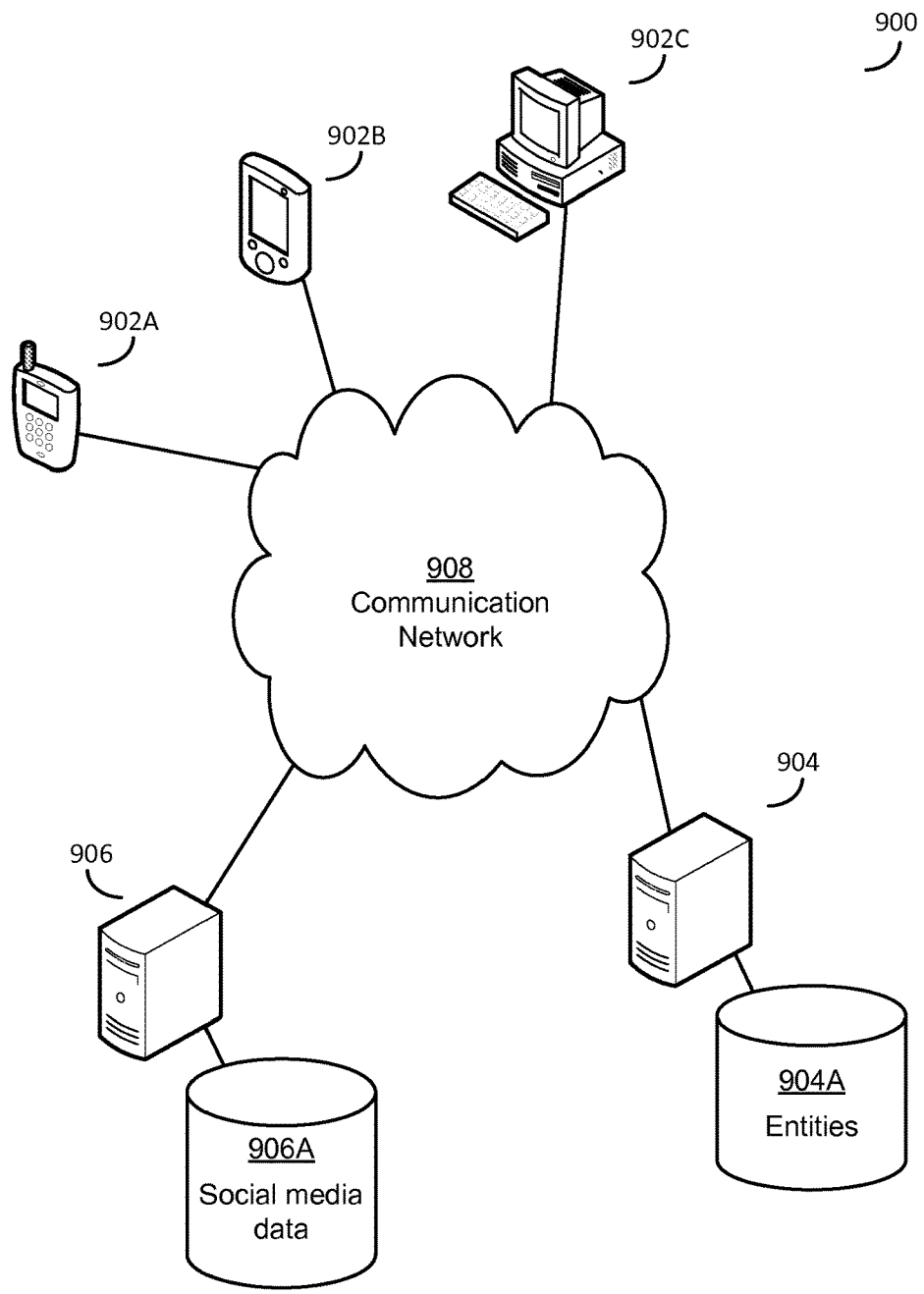
FIG. 9 illustrates one exemplary computer system in which some embodiments may operate.

In some, but not all, implementations in which the techniques may be embodied as computer-executable instructions, these instructions may be executed on one or more suitable computing device(s) operating in any suitable computer system, including the exemplary computer system of FIG. 9. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 8:
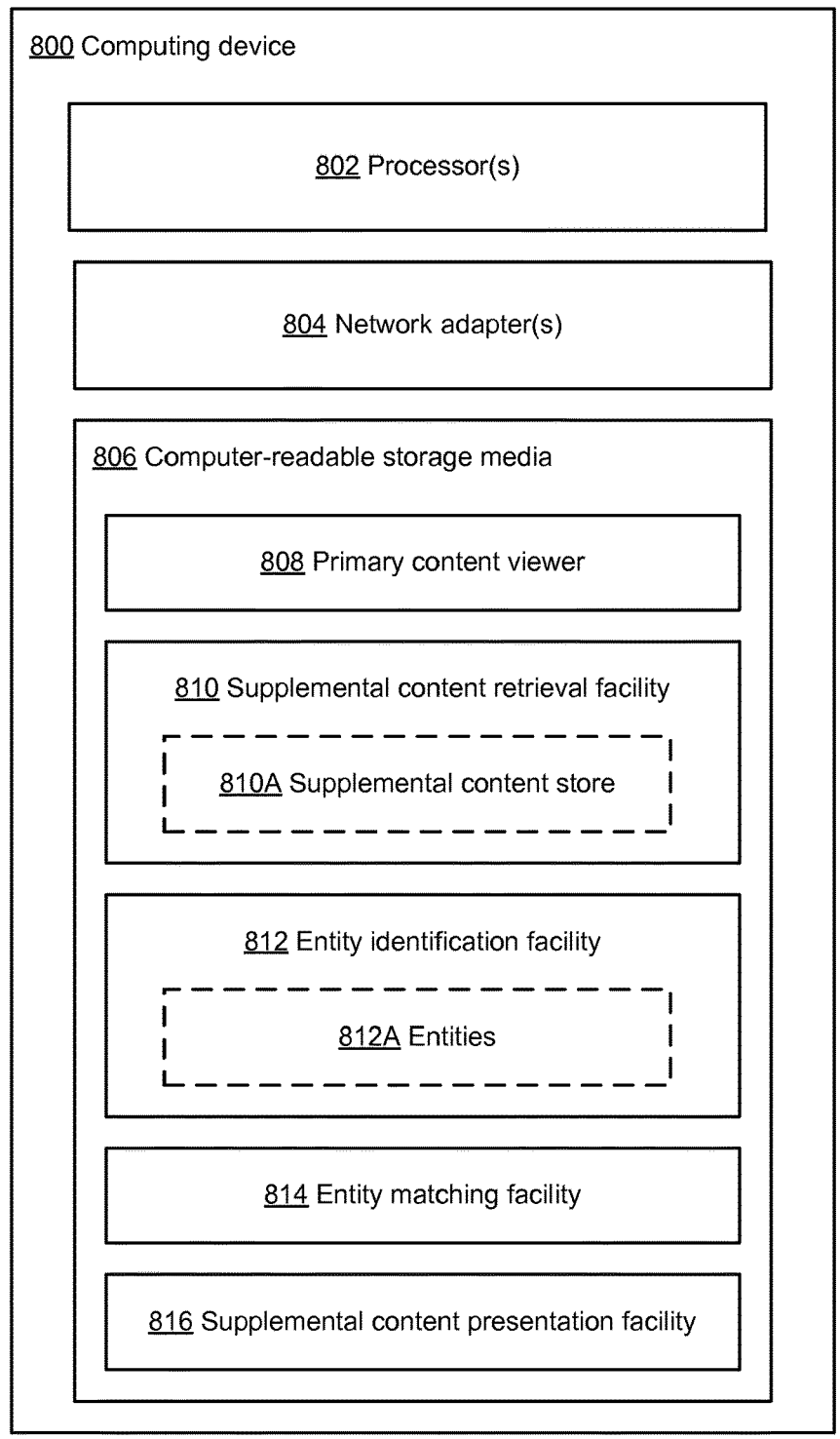
FIG. 8 is a block diagram of one exemplary computing device with which some embodiments may operate.

FIG. 8 illustrates one exemplary implementation of a computing device in the form of a computing device 800 that may be used in a system implementing the techniques described herein, although others are possible. It should be appreciated that FIG. 8 is intended neither to be a depiction of necessary components for a computing device to operate in accordance with the principles described herein, nor a comprehensive depiction.

Computing device 800 may comprise at least one processor 802, a network adapter 804, and computer-readable storage media 806. Computing device 800 may be, for example, a desktop or laptop personal computer, a personal digital assistant (PDA), a smart mobile phone, a server, or any other suitable computing device. Network adapter 804 may be any suitable hardware and/or software to enable the computing device 800 to communicate wired and/or wirelessly with any other suitable computing device over any suitable communication network. The communication network may include wireless access points, switches, routers, gateways, and/or other networking equipment as well as any suitable wired and/or wireless communication medium or media for exchanging data between two or more computers. In some cases, the communication network may include multiple networks and may include the Internet. Computer-readable media 806 may be adapted to store data to be processed and/or instructions to be executed by processor 802. Processor 802 enables processing of data and execution of instructions. The data and instructions may be stored on the computer-readable storage media 806 and may, for example, enable communication between components of the computing device 800.

The data and instructions stored on computer-readable storage media 806 may comprise computer-executable instructions implementing techniques which operate according to the principles described herein. In the example of FIG. 8, computer-readable storage media 806 stores computer-executable instructions implementing various facilities and storing various information as described above. Computer-readable storage media 806 may store a primary content viewer 808 that may present primary content to a user via any suitable user interface and a supplemental content presentation facility 816 that may present supplemental content to a user via any suitable user interface. Computer-readable storage media 806 may also store a supplemental content retrieval facility 810 for retrieving supplemental content from one or more sources and a data store 810A of supplemental content. The computer-readable storage media 806 may further store an entity identification facility 812 that may maintain any suitable data store 812A of entities detected in either or both of primary content and supplemental content. The computer-readable storage media 806 may further store an entity matching facility 814 that may query a data store of entities related to primary content and to supplemental content to determine matches between primary content and supplemental content and to select supplemental content to be presented to the user based on the matches.

While not illustrated in FIG. 8, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Computing device 800 may be implemented in any suitable computer system. FIG. 9 shows one example of a computer system in which some embodiments may operate. The computer system 900 includes client computing devices 902, including smart phone 902A, personal digital assistant (PDA) 902B, and desktop personal computer 902C. Each of the client computing devices 902 may be used by users to experience primary content and may present supplemental content to be viewed by the user when the supplemental content is detected to be potentially relevant to the user. In some embodiments, each of the client computing devices 902 may analyze primary content for entities, retrieve supplemental content from one or more sources to be analyzed for entities and presented to the user based on a comparison to entities of the primary content, and present the supplemental content to the user. For example, each of the client computing devices may retrieve social media data from a server 906 that hosts a social network service and maintains a data store 906A of social media data. In other embodiments, however, all or some of the client computing devices 902A (e.g., smart phone 902A and PDA 902B, with limited processing capabilities) may provide primary content and/or supplemental content to a server 904 to be analyzed. The server 904 may store entities appearing in primary and/or supplemental content in a data store 904A and provide the entities to the client computing devices 902.

Client computing devices 902 and servers 904, 906 may be connected via any suitable communication network 908. In embodiments, communication network 908 may be any suitable wired and/or wireless communication network that allows data to be exchanged between the computing devices, including a local area network, an enterprise network, and/or the Internet.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

The invention claimed is:

1. A method for displaying at least a portion of available supplemental content in context, the method comprising:
    identifying, in primary content that is being presented on a display of a computing device of a user, an entity referenced in the primary content;
    inferring that the entity referenced in the primary content is of interest to the user, wherein inferring that the entity is of interest to the user comprises:
        computing a score for the entity, the score computed based upon a number of messages that reference the entity, the messages posted by contacts of the user by way of at least one social media application, wherein the entity is inferred to be of interest to the user based upon the score computed for the entity;
    responsive to inferring that the entity is of interest to the user, selecting a message for display that references the entity from amongst the messages, the message selected for display based upon a time when the message was posted; and
    displaying a view on the display together with the primary content, the view comprises the message and an interface unit that is configured to receive a reply to the message from the user.

2. The method of claim 1, the message posted by way of a message broadcasting application by a contact to whom the user has subscribed.

3. The method of claim 1, further comprising:
    identifying a plurality of entities referenced in the primary content, the entity included in the plurality of entities, wherein inferring that the entity is of interest to the user further comprises:
    assigning a respective score to each entity in the plurality of entities; and ordering the plurality of entities based upon scores assigned thereto, the message displayed based upon the entity being highest in the ordering of the plurality of entities.

4. The method of claim 3, wherein the score for the entity is further based upon at least one of:
a position of the entity in the primary content;
number of occurrences of the entity in the primary content; or
whether or not the entity is capitalized in the primary content.

5. The method of claim 3, wherein computing the score for the entity comprises:
determining a structure of the primary content; and
computing the score for the entity based upon a placement of the entity in the structure of the primary content.

6. The method of claim 1, wherein identifying the entity comprises:
identifying a second entity in the primary content;
canonicalizing the second entity to determine a root entity for the second entity;
when the root entity has multiple meanings, analyzing at least one other root entity for the primary content to determine a context in which the root entity is used; and
identifying the entity based upon the context in which the root entity is used.

7. The method of claim 1, further comprising:
retrieving the messages from the at least one social media application; and
analyzing each message to determine, for each message, whether the entity is referenced in the message.

8. The method of claim 7, further comprising:
receiving an input from the user specifying the at least one social media application; and
retrieving data from the at least one social media application to yield the messages.

9. A computer-readable storage medium encoded with computer-executable instructions that, when executed by a computer, cause the computer to carry out a method comprising:
retrieving social media data from at least one social media application, the social media data comprises a plurality of messages generated by way of at least one social media application, the plurality of messages posted by way of the at least one social media application by contacts of a user of the at least one social media application, each message in the messages comprises text;
identifying that a first entity is referenced in primary content and that a second entity is referenced in the primary content, the primary content being presented on a display;
inferring that the first entity referenced in the primary content is of more interest to the user than the second entity referenced in the primary content, wherein inferring that the first entity is of more interest to the user than the second entity comprises:
ordering the first entity relative to the second entity to yield an ordered set of entities in the primary content, the first entity positioned higher in the ordered set of entities than the second entity, wherein the ordering of the first entity relative to the second entity is based on the first entity being referenced in a larger number of messages in the plurality of messages than the second entity, and further wherein the first entity is inferred to be of more interest to the user than the second entity based upon the first entity being positioned higher in the ordered set of entities than the second entity;
subsequent to inferring that the first entity is of more interest to the user than the second entity, selecting, from the social media data, at least one message of the social media data that references the first entity for display; and
responsive to selecting the at least one message of the social media data for display, displaying a view together with the primary content on the display, the view comprises the at least one message and an interface unit that is configured to receive a reply to the at least one message from the user.

10. The computer-readable storage medium of claim 9, wherein the primary content is a web page, and wherein identifying the first entity and the second entity comprises analyzing entities mentioned in text of the web page.

11. The computer-readable storage medium of claim 9, wherein ordering the first entity relative to the second entity further comprises inferring that the first entity relates to a general interest of the user.

12. The computer-readable storage medium of claim 9, wherein the ordering of the first entity relative to the second entity is based upon social media applications used to generate messages that reference the first entity and social media applications used to generate messages that reference the second entity.

13. The computer-readable storage medium of claim 9, wherein the method further comprises:
canonicalizing a third entity in the primary content to determine a root entity for the third entity;
when the root entity has multiple meanings, determining a context in which the root entity is referenced in the primary content; and
identifying the root entity as the first entity based upon the context in which the root entity is referenced in the primary content.

14. The computer-readable storage medium of claim 9, wherein the method further comprises:
receiving an input from the user specifying identifies of the at least one social media application; and
retrieving the social media data from the at least one social media application to yield the at least one message based upon the input from the user.

15. A computing apparatus comprising:
at least one processor that is programmed to perform acts comprising:
identifying an entity referenced in primary content that is being presented on a display of a computing device of a user;
inferring that the entity referenced in the primary content is of interest to the user, wherein inferring that the entity is of interest to the user comprises:
assigning a score to the entity based upon a number of messages that reference the entity, the messages posted by contacts of the user by way of at least one social media application, wherein the entity is inferred to be of interest to the user based upon the score;
responsive to inferring that the entity is of interest to the user:
determining a time when a message that comprises a reference to the entity was posted, the message being amongst the messages; and selecting the message for display based upon:
  the entity being inferred as being of interest to the user;
  the message comprising the reference to the entity; and
  the time when the message was posted; and
responsive to selecting the message for display, displaying a view on the display concurrently with the primary content, the view comprises the selected message and an interface unit that is configured to receive a reply to the message from the user.

16. The apparatus of claim 15, wherein the time when the message was posted indicates that the message was posted more recently than other of the messages that reference the entity.

17. The apparatus of claim 15, further comprising:
responsive to inferring that the entity is of interest to the user:
  determining a social media application used to post the message; and
  selecting the message based upon the social media application used to post the message.

18. The apparatus of claim 15, wherein inferring that the entity is of interest to the user further comprises:
  determining a position in the primary content where the entity is referenced,
  wherein the score is assigned to the entity based upon the position in the primary content where the entity is referenced.

19. The apparatus of claim 15, wherein inferring that the entity is of interest to the user further comprises:
  determining a number of times that the entity is referenced in the primary content, wherein the score is assigned to the entity based upon the number of times that the entity is referenced in the primary content.

20. The method of claim 1, wherein inferring that the entity is of interest to the user further comprises:
  ordering the entity relative to a second entity to yield an ordered set of entities in the primary content, the entity positioned higher in the ordered set of entities than the second entity, wherein the ordering of the entity relative to the second entity is based on the first entity being referenced in a larger number of the messages than the second entity, wherein the message is inferred to be of more interest to the user than the second entity based on the first entity being referenced in the larger number of the messages than the second entity, and further wherein the entity is selected for display on the display based upon the ordering of the entity relative to the second entity.

21. The computing apparatus of claim 15, wherein inferring that the entity is of interest to the user further comprises:
  ordering the entity relative to a second entity to yield an ordered set of entities in the primary content, the entity positioned higher in the ordered set of entities than the second entity, wherein the ordering of the entity relative to the second entity is based on the first entity being referenced in a larger number of the messages than the second entity, wherein the message is inferred to be of more interest to the user than the second entity based on the first entity being referenced in the larger number of the messages than the second entity, and further wherein the entity is selected for display on the display based upon the ordering of the entity relative to the second entity.

* * * * *